US010177469B2

(12) United States Patent
Wu et al.

(10) Patent No.: US 10,177,469 B2
(45) Date of Patent: Jan. 8, 2019

(54) CABLE CONNECTOR

(71) Applicant: COMMSCOPE TECHNOLOGIES LLC, Hickory, NC (US)

(72) Inventors: Jianping Wu, Jiangsu (CN); Yujun Zhang, Jiangsu (CN); Hongjuan An, Jiangsu (CN); Huifang Zhou, Jiangsu (CN)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/736,556

(22) PCT Filed: Jul. 28, 2016

(86) PCT No.: PCT/CN2016/092001
§ 371 (c)(1),
(2) Date: Dec. 14, 2017

(87) PCT Pub. No.: WO2017/016498
PCT Pub. Date: Feb. 2, 2017

(65) Prior Publication Data
US 2018/0175520 A1    Jun. 21, 2018

(30) Foreign Application Priority Data

Jul. 28, 2015  (CN) .......................... 2015 1 0449596

(51) Int. Cl.
*H01R 9/05*     (2006.01)
*H02G 15/08*    (2006.01)
(52) U.S. Cl.
CPC ......... *H01R 9/0524* (2013.01); *H01R 9/0527* (2013.01); *H02G 15/085* (2013.01)
(58) Field of Classification Search
CPC ... H01R 9/0524; H01R 9/0527; H02G 15/085
(Continued)

(56) References Cited

U.S. PATENT DOCUMENTS 5,207,602 A * 5/1993 McMills ................ H01R 9/053
                                                          439/578
5,518,420 A * 5/1996 Pitschi .................. H01R 24/564
                                                          439/578
(Continued)

FOREIGN PATENT DOCUMENTS

CN      1112301 A     11/1995
CN    104638429 A      5/2015

OTHER PUBLICATIONS

International Search Report corresponding to International Application No. PCT/CN2016/092001, dated Nov. 10, 2016.

*Primary Examiner* — Abdullah Riyami
*Assistant Examiner* — Nelson R Burgos-Guntin
(74) *Attorney, Agent, or Firm* — Myers Bigel, P.A.

(57) ABSTRACT

A connector (20) for a coaxial cable (10). The cable comprises an outer conductor (11), an inner conductor (12) and an insulating medium (13) located between the outer and the inner conductors, wherein the connector comprises a connector front body (21) and a connector rear body (22) inserted therein; the connector front body comprises a hollow shell (30); the connector rear body comprises a flare ring (50), a slot finger and a lock nut (70) which are inserted into the shell, wherein the flare ring at one end thereof rests against a shoulder (37) in the shell, the slot finger is mounted on the flare ring, and the lock nut is mounted on the slot finger and engages the inner surface of the shell; the flare ring is provided with adjacent the first incline (54) and the first plane (55), and the slot finger is provided with adjacent the second incline (67) and the second plane (66), wherein the first incline is used for insertion between the outer conductor and the insulating medium of the coaxial cable, and the first incline and the first plane respectively cooperate with the second incline and the second plane, so as to simultaneously flare and crush the outer conductor of the (Continued)

coaxial cable. The cable connector can gain excellent third order intermodulation performance and high frequency transmission performance.

17 Claims, 6 Drawing Sheets

(58) Field of Classification Search
USPC .................................. 439/583, 578, 584, 585
See application file for complete search history.

(56) References Cited

U.S. PATENT DOCUMENTS

| | | | | |
|---|---|---|---|---|
| 5,766,037 | A * | 6/1998 | Nelson | H01R 24/564 439/583 |
| 7,435,135 | B2 * | 10/2008 | Wlos | H01R 24/564 439/277 |
| 8,608,507 | B2 * | 12/2013 | Van Swearingen | H01R 12/79 439/317 |
| 9,941,609 | B2 * | 4/2018 | Paynter | H01R 9/0521 |
| 2012/0088381 | A1 * | 4/2012 | Wild | H01R 13/17 439/131 |
| 2012/0252265 | A1 * | 10/2012 | Wild | H01R 9/0521 439/578 |
| 2013/0178097 | A1 * | 7/2013 | Wild | H01R 13/623 439/583 |
| 2013/0244487 | A1 * | 9/2013 | Van Swearingen | B23K 20/129 439/583 |

* cited by examiner

CABLE CONNECTOR

RELATED APPLICATIONS

This application is a 35 U.S.C. § 371 national phase application of and claims priority to PCT Application PCT/CN2016/092001 flied Jul. 28, 2016, which claims priority to Chinese Application No. 201510449596.8 filed Jul. 28, 2015, the entire contents of which are incorporated herein by reference in their entirety.

TECHNICAL FIELD

The present invention relates to a cable connector, more particularly, the present invention relates to a cable connector which connects a threaded coaxial cable by means of simultaneously flaring the cable outer conductor and crushing the cable outer conductor.

BACKGROUND ART

The threaded coaxial cable for communication has a threaded outer conductor, an inner conductor, and an insulating medium located between the outer and inner conductors. The inner conductor may be a hollow threaded conductor or a solid cylindrical conductor. The connector is attached to an end of the coaxial cable, so as to couple the coaxial cable. The connector which demands a field installation generally adopts the means of expanding the end of the cable outer conductor (or referred to as flare cable outer conductor), or adopts the means of crushing the cable outer conductor to realize the mechanical and electrical connection between the coaxial cable outer conductor and the connector.

EP0757408A2 discloses a connector for a coaxial cable, the connector comprising a main body member 30, a clamping member 51 and a coupling nut 40. The main body member 30 is provided in its internal cavity with a conically beveled clamping surface 32, while the clamping member 51 is provided at one end thereof with a second clamping surface 50 cooperating with the clamping surface 32. The conically beveled clamping surface 32 is inserted between an outer conductor 11 and a dielectric 13 of a coaxial cable 10 and flares the outer conductor 11 of the coaxial cable 10, and then clamps the outer conductor 11 by means of the cooperation between the clamping surface 32 and the second clamping surface 50. EP0757408A2 realizes the connection between the coaxial cable outer conductor and the connector by means of flaring. Because the deformation of the coaxial cable outer conductor is not significant during the flaring process, the transmission performance of the coaxial cable is comparatively good. However, as to a threaded coaxial cable, the spiral end face of the coaxial cable is not a regular circle, and thus the compression forces on the sections over the circumference of the coaxial cable are inconsistent, which cannot guarantee that the sections over the circumference of the coaxial cable are completely contacted. Accordingly, the third order intermodulation performance of the coaxial cable cannot be guaranteed.

U.S. Pat. No. 5,766,037 discloses a further connector for a coaxial cable, the connector comprising a main body 50, a clamping collet 40 and a back nut 30, which clamping collet 40 is arranged in the main body 50. The cable is screwed into the main body 50 till abutment against the clamping collet 40, the back nut 30 is fastened and the main body 50 is tightened such that the opposite cooperating surfaces between the back nut 30 and the clamping collet 40 crush the outer conductor 14 of the cable, so as to clamp the outer conductor of the cable between the main body 50 and the clamping collet 40. U.S. Pat. No. 5,766,037 realizes the connection between the coaxial cable outer conductor and the connector by means of crushing, and the torque and the third order intermodulation performance of the coaxial cable are greatly improved. However, the deformation of the coaxial cable is comparatively significant, thereby reducing the high frequency transmission performance of the connector, which can only be guaranteed up to 3 GHz, generally speaking.

Therefore, among the threaded coaxial cable connectors in the prior art, as to the connector which demands a field installation, if the structure of flare cable outer conductor is not adopted, an excellent high frequency transmission performance cannot be gained, and if the structure of crush cable outer conductor is not adopted, an excellent third order intermodulation performance and cable torque cannot be gained.

CONTENTS OF THE INVENTION

In order to solve the aforesaid problem, the present invention puts forward a cable connector which connects a threaded coaxial cable by simultaneously flaring the cable outer conductor and crushing the cable outer conductor, and the cable connector can gain excellent third order intermodulation performance and high frequency transmission performance. Thus, the cable connector of the present invention can be widely applied to super-soft threaded coaxial cable connectors which demand a field installation, for example, SMA, TNC, N, DIN and so on.

One aspect of the present invention discloses a connector for a coaxial cable, the coaxial cable comprising an outer conductor, an inner conductor and an insulating medium located between the outer and inner conductors, wherein the connector comprises a hollow shell, a coupling nut mounted on the shell, and a connector inner conductor, a flare ring, a slot finger and a lock nut which are arranged together in the shell, the flare ring at one end thereof resting against a shoulder in the shell, the slot finger being mounted on the flare ring, and the lock nut being mounted on the slot finger and engaging the inner surface of the shell; wherein the flare ring is provided with adjacent first incline and first plane, and the slot finger is provided with adjacent second incline and second plane, the first incline being used for insertion between the outer conductor and the insulating medium of the coaxial cable, and the first incline and the first plane respectively cooperating with the second incline and the second plane, so as to simultaneously flare and crush the outer conductor of the coaxial cable.

Preferably, the connector comprises a connector front body and a connector rear body screwed therein, the connector front body comprises the shell, the coupling nut and the connector inner conductor which are connected together, and the connector rear body comprises the flare ring, the slot finger and the lock nut which are connected together.

Preferably, the flare ring, the slot finger and the lock nut are connected together by a snap-fit connection.

Preferably, the connector comprises a connector front body and a connector rear body screwed therein, the connector front body comprises the shell, the coupling nut, the connector inner conductor and the flare ring which are connected together, and the connector rear body comprises the slot finger and the lock nut which are connected together.

Preferably, the flare ring is mounted in an internal cavity of the shell by a snap-fit connection, and the slot finger and the lock nut are connected together by a snap-fit connection.

Preferably, the shell comprises a main body section and a projecting section which projects axially forward from the main body section, and the main body section comprises the shoulder and receives in its internal cavity the flare ring, the slot finger and the lock nut.

Preferably, the coupling nut surrounds the shell and is mounted on the projecting section of the shell.

Preferably, the projecting section is provided in its internal cavity with the connector inner conductor which is fastened in the internal cavity of the projecting section by means of a fastening ring made from an insulator.

Preferably, the connector inner conductor is provided on its rear end with a slotted, elastic grip hole for receiving the inner conductor of the coaxial cable.

Preferably, the flare ring comprises a substrate section, a protruding section and a shoulder therebetween for connecting the substrate section and the protruding section, the substrate section rests against the shoulder of the shell, and the protruding section is provided on its axial rear end with the first incline and the first plane.

Preferably, the protruding section is loaded with a spring coil for adjusting the relative distance between the flare ring and the slot finger, so as to further control and adjust the stamina torque of the coaxial cable.

Preferably, the slot finger comprises a substrate section and a wedge section which is axially tapered rearward from the substrate section.

Preferably, the substrate section comprises an engaging part mounted on the protruding section, a crushing part, and a threaded part which engages the outer thread of the outer conductor of the cable, and the crushing part comprises the second incline and the second plane, the second incline and the second plane respectively cooperating with the first incline and the first plane on the flare ring for simultaneously flaring and crushing the outer conductor of the coaxial cable.

Preferably, the internal cavity of the lock nut is tapered for cooperating with the wedge section of the slot finger, so as to clamp the outer conductor of the coaxial cable and to fasten the coaxial cable in place in the connector.

Preferably, the coupling nut is provided on the front side of the outer surface thereof with an outer thread for cooperating with the inner thread on the inner surface of the shell.

A second aspect of the present invention discloses a connector for a coaxial cable, the coaxial cable comprising an outer conductor, an inner conductor and an insulating medium located between the outer and inner conductors, wherein the connector comprises a connector front body and a connector rear body screwed therein, the connector front body comprises a shell, and the connector rear body comprises a flare ring and a slot finger which are inserted into the shell, the flare ring at one end thereof resting against a shoulder in the shell and the slot finger being mounted on the flare ring; wherein the flare ring is provided with adjacent first incline and first plane, and the slot finger is provided with adjacent second incline and second plane, the first incline being used for insertion between the outer conductor and the insulating medium of the coaxial cable, and the first incline and the first plane respectively cooperating with the second incline and the second plane, so as to simultaneously flare and crush the outer conductor of the coaxial cable.

A third aspect of the present invention discloses a connector for a coaxial cable, the coaxial cable comprising an outer conductor, an inner conductor and an insulating medium located between the outer and inner conductors, wherein the connector comprises a connector front body and a connector rear body screwed therein, the connector front body comprises a shell and a flare ring mounted in the shell, and the connector rear body comprises a slot finger which is inserted into the shell; wherein the flare ring is provided with adjacent first incline and first plane, and the slot finger is provided with adjacent second incline and second plane, the first incline being used for insertion between the outer conductor and the insulating medium of the coaxial cable, and the first incline and the first plane respectively cooperating with the second incline and the second plane, so as to simultaneously flare and crush the outer conductor of the coaxial cable.

BRIEF DESCRIPTION OF THE DRAWINGS

Unless otherwise explicitly declared, the features indicated in the drawings are not drawn to scale, and the relative dimensions of some features are exaggerated for better illustrating the features. References will be made to the following drawings to describe the embodiments, and similar reference signs in all the drawings in the embodiments represent similar objects, among which.

EMBODIMENTS

Although it is easy to make various modifications and variations to the present invention, yet one embodiment will be described below in detail by way of example. However, it needs to be understood that this does not mean that the present invention is restricted to the specific forms as described; on the contrary, the present invention intends to cover all the variation solutions and substitute solutions within the scope of the present invention as defined by the appended claims.

Figure 1:
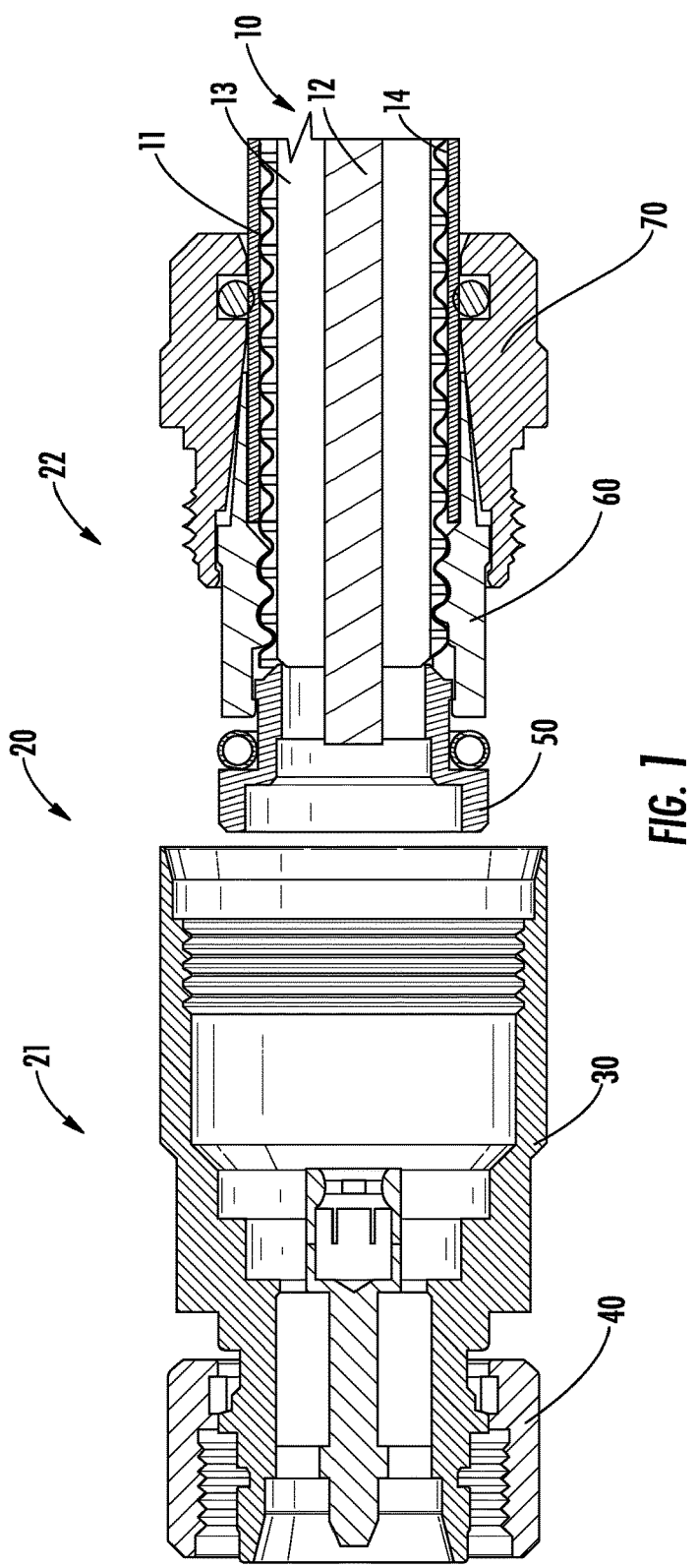
FIG. 1 illustrates a sectional view of a connector of one embodiment according to the present invention, wherein the connector front body and the connector rear body are shown separately.

Now turning to the drawings, one embodiment of a connector 20 for connecting a threaded coaxial cable 10 is explained. As illustrated in FIG. 1, the coaxial cable 10 comprises a threaded outer conductor 11, a solid inner conductor 12 which is coaxial with and apart from the outer conductor 11 with respect to one another, and an insulating medium 13 located between the outer conductor 11 and the inner conductor 12, and the outer side of the outer conductor 11 is usually covered with a plastic sheath 14.

Figure 2:
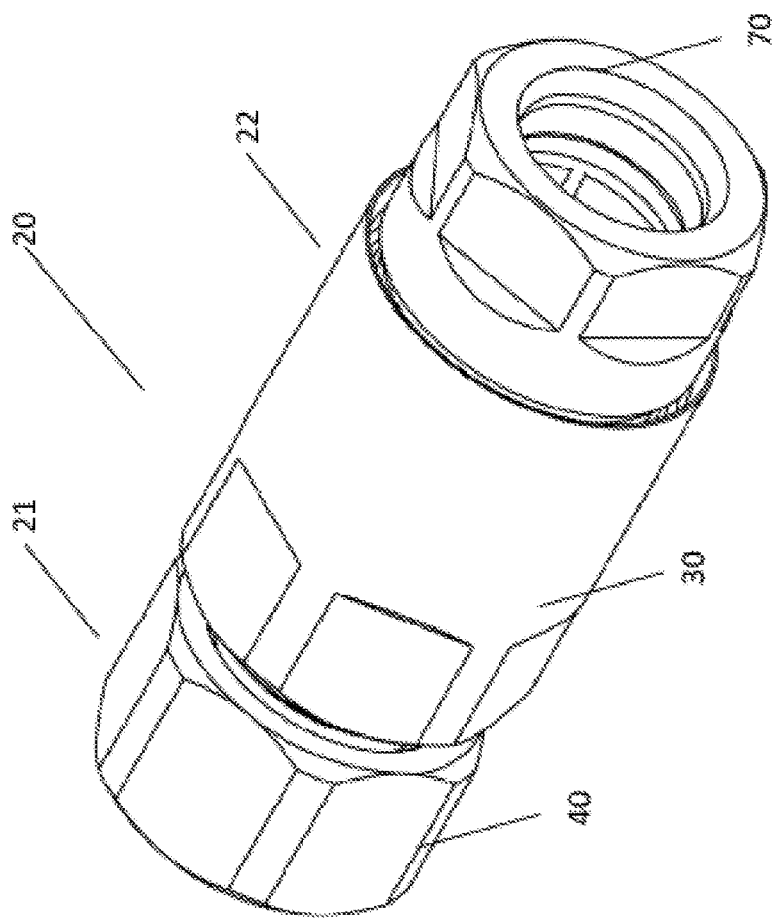
FIG. 2 illustrates a perspective view of a connector of one embodiment according to the present invention, wherein the connector front body and the connector rear body are assembled together.

As illustrated in FIGS. 1 and 2, the connector 20 comprises a connector front body 21 and a connector rear body 22. The connector front body 21 comprises a hollow shell 30, and a coupling nut 40 which surrounds the shell 30 and is mounted on the shell 30. The connector rear body 22 comprises a flare ring 50, a slot finger 60 and a lock nut 70 which are assembled together. The cable 10 can be connected to the connector 20 by means of screwing the connector rear body 22 into the connector front body 21.

Figure 3:
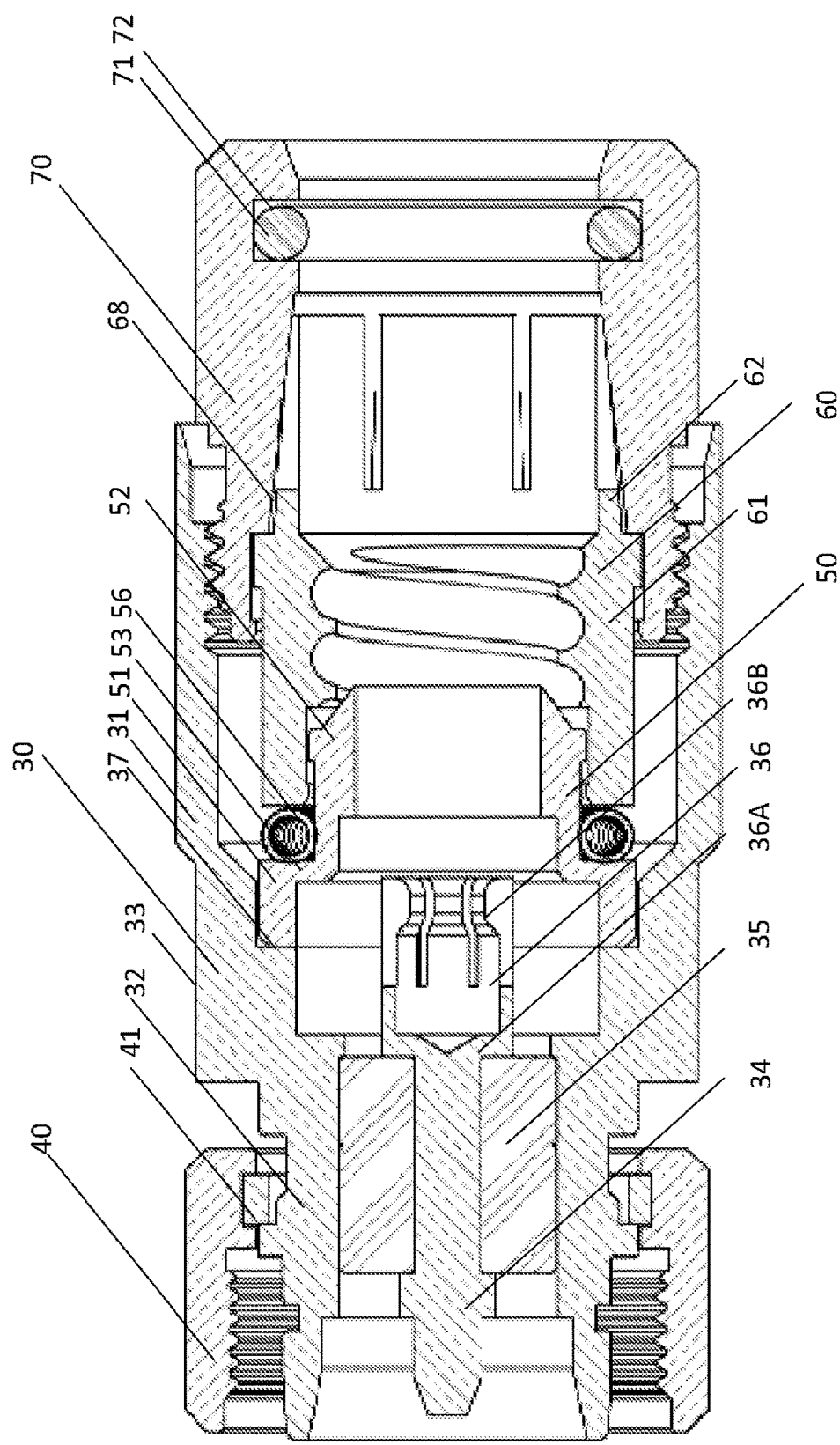
FIG. 3 illustrates a sectional view of a connector of one embodiment according to the present invention, wherein the connector front body and the connector rear body are assembled together.

As illustrated in FIG. 3, the shell 30 comprises a cylindrical main body section 31, and a cylindrical projecting section 32 which projects axially forward from the main body section 31. The outer surface of the main body section 31 is provided around the circumferential direction with a number of flat surfaces 33, so as to facilitate gripping of the main body section 31 by a wrench tool, and the main body section 31 is subsequently rotated for connection of the connector rear body 22 already assembled with the cable 10.

The projecting section 32 has a cross-section in a direction perpendicular to the axial direction smaller than the cross-section of the main body section 31, and receives in its internal cavity a pin-shaped inner conductor 34. The inner conductor 34 is fastened in the internal cavity of the projecting section 32 by means of a fastening ring 35 made from an insulator and is electrically insulated from the projecting section 32. The inner conductor 34 is provided on its rear end with an elastic grip hole 36 for receiving the inner conductor 12 of the cable 10. Preferably, the elastic grip hole 36 has a cylindrical part 36A which is located on the front side and which has a slightly larger diameter, and an elastic finger-shaped part 36B which is located on the rear side and which has a slightly smaller diameter than the diameter of the cable inner conductor 12. When the inner conductor 12 of the cable 10 is inserted into the elastic grip hole 36, the finger-shaped part 36B makes an elastic deformation, thereby firmly gripping the cable inner conductor 12.

The coupling nut 40 is fastened to a flange of the projecting section 32 by means of a collar 41. The collar 41 restricts the coupling nut 40 radially and axially on the projecting section 32, and at the same time allows the circumferential rotation of the coupling nut 40 on the projecting section 32. The coupling nut 40 cooperates with the projecting section 32, so as to connect the female connector by means of a threaded connection.

Figure 4:
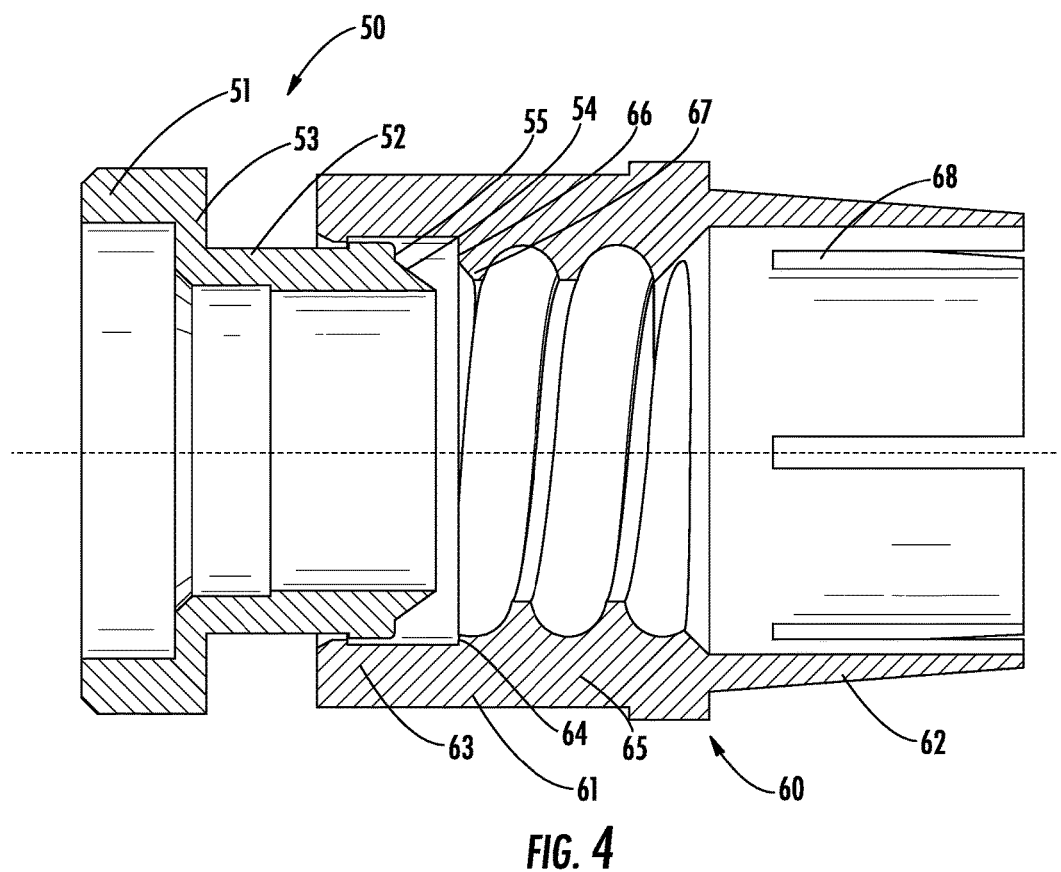
FIG. 4 illustrates an enlarged view of a flare ring and a slot finger of a connector of one embodiment according to the present invention.
Figure 5:
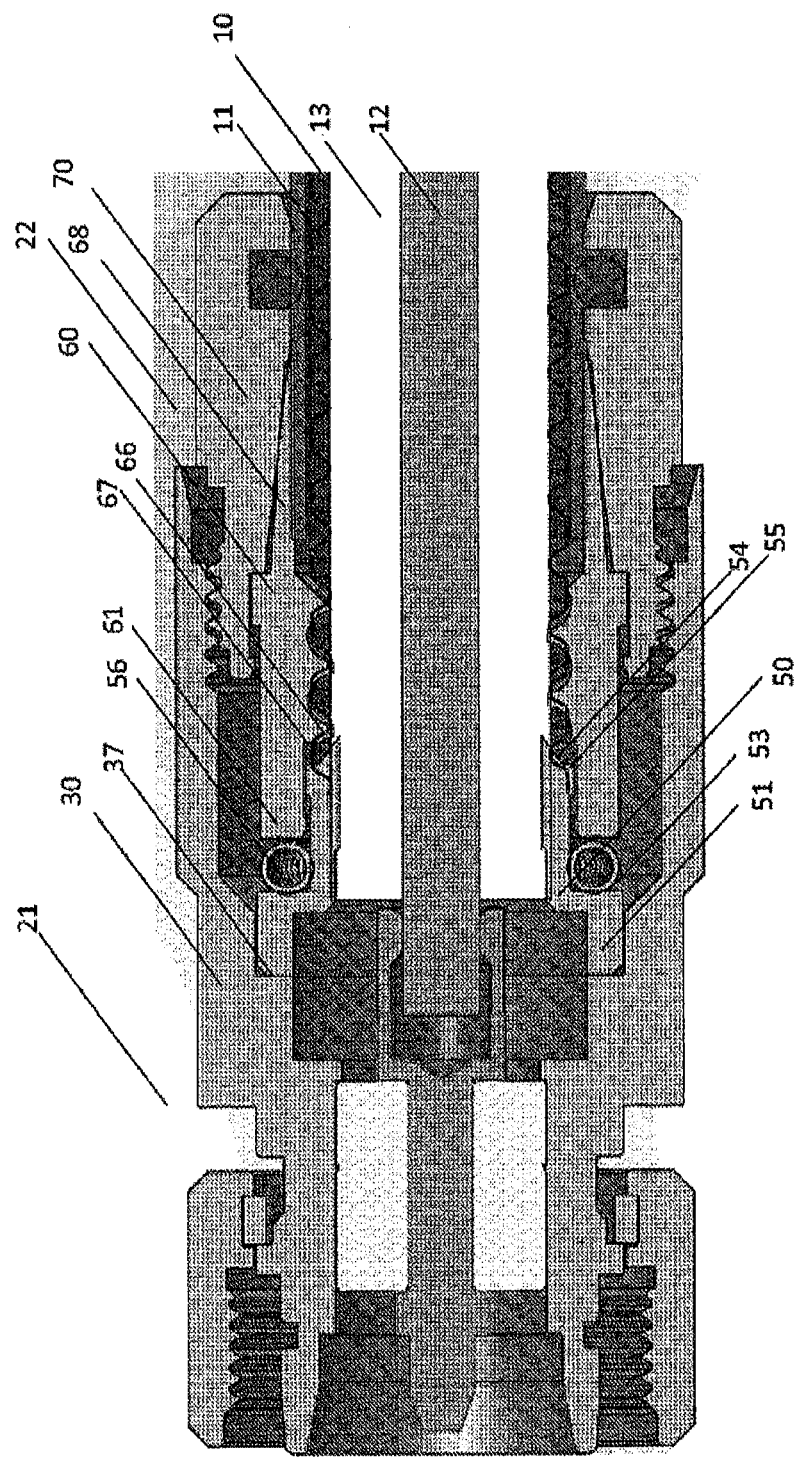
FIG. 5 illustrates a sectional view of a connector of one embodiment according to the present invention, wherein a cable is assembled.

As illustrated in FIGS. 3 and 4, the flare ring 50 comprises a cylindrical substrate section 51 with a slightly larger diameter, a cylindrical protruding section 52 with a slightly smaller diameter, and a shoulder 53 located between the substrate section 51 and the protruding section 52. When the connector rear body 22 including the flare ring 50, the slot finger 60 and the lock nut 70 is inserted into the shell 30, the substrate section 51 rests against the shoulder 37 inside the main body section 31. The protruding section 52 extends axially rearward from the shoulder 53, and is provided on its axial rear end with adjacent first incline 54 and first plane 55. The first incline 54 is inserted between the outer conductor 11 and the insulating medium 13 of the cable 10 for flaring the outer conductor 11 of the cable 10; thereafter the first plane 55 cooperates with the corresponding second plane on the slot finger 60 for crushing the outer conductor 11 of the cable 10. The protruding section 52 is further loaded thereon with a spring coil 56. After the connector rear body 22 is inserted into the connector front body 21, the lock nut 70 is fastened and the shell 30 is tightened such that the axial force of the slot finger 60 forces the spring coil 56 against the shoulder 53 of the flare ring 50, and the relative distance between the flare ring 50 and the slot finger 60 is adjusted, so as to control and adjust the stamina torque of the cable.

As illustrated in FIGS. 3 and 4, the slot finger 60 comprises a cylindrical substrate section 61 and a wedge section 62 which is axially tapered rearward from the substrate section 61 and which is slotted. The substrate section 61 is provided successively in its internal cavity from the front to the rear along the axial direction with an engaging part 63, a crushing part 64 and a threaded part 65. The inner diameter of the engaging part 63 is slightly greater than the outer diameter of the protruding section 52 of the flare ring 50, so that the engaging part 63 can be mounted on the protruding section 52 and axially slide on the protruding section 52. The crushing part 64 of the substrate section 61 comprises the second incline 67 and the second plane 66, the second incline 67 and the second plane 66 respectively cooperating with the first incline 54 and the first plane 55 on the flare ring 50 for simultaneously flaring and crushing the outer conductor 11 of the cable 10. The threaded part 65 is provided with an inner thread which mates with the outer thread of the outer conductor 11 of the coaxial cable 10 for receiving and fastening the outer conductor 11 of the cable 10. The wedge section 62 is slotted with six slots or eight slots, so that around its longitudinal axis a number of tapered elastic finger-shaped members 68 are provided. The finger-shaped members 68 cooperate with the tapered internal cavity of the lock nut 70 for clamping the outer conductor 11 of the cable 10.

As illustrated in FIG. 3, the lock nut 70 is provided on the front side of its outer surface with an outer thread, for cooperating with the inner thread on the inner surface of the main body section 31 of the shell 30. The internal cavity of the lock nut 70 is tapered for receiving the wedge section 62 of the slot finger 60. When the outer thread of the lock nut 70 is screwed into the inner thread of the main body section 31 of the shell 30, the inner wedge of the lock nut 70 continuously compresses the elastic finger-shaped members 68, so that the elastic finger-shaped members 68 clamp the outer conductor 11 of the cable 10. In order to provide a humidity resistant layer between the inner surface of the lock nut 70 and the outer conductor 11 of the cable 10, an elastic O-ring 71 made of silicone rubber is arranged in a groove 72 in the lock nut 70 behind the inner wedge. When the cable 10 is inserted into the connector rear body 22, the cable 10 slightly compresses the O-ring 71, so that the O-ring 71 firmly abuts between the outer sheath of the cable 10 and the groove 72 of the lock nut 70, so as to ensure humidity resistance and water resistance between the inner surface of the lock nut 70 and the outer conductor 11 of the cable 10. The outer surface of the protruding section 52 of the flare ring 50 and the inner surface of the substrate section 61 of the slot finger 60 are designed with a particular distance, namely the distance between the first plane 55 and the second plane 66. When the cable outer conductor 11 abuts against the first plane 55 of the flare ring 50 after being screwed into the inner thread of the slot finger 60, the cable 10 cannot be further screwed, which determines the compressed length of the cable outer conductor 11, so as to control and adjust the stamina torque of the cable 10 after being placed into the connector.

The outer surface of the protruding section 52 of the flare ring 50 and the inner surface of the substrate section 61 of the slot finger 60 are respectively provided with flanges, so as to enable the flare ring 50 and the slot finger 60 connected together by a snap-fit connection. The outer surface of the substrate section 61 of the slot finger 60 and the inner surface of the lock nut 70 are respectively provided with flanges, so as to enable the slot finger 60 and the lock nut 70 connected together by a snap-fit connection.

The connecting process of the cable 10 and the connector 20 is described below. Firstly, an end of the cable 10 to be connected to the connector 20 is prepared. One end of the cable 10 is cut along a plane perpendicular to the longitudinal axis of the cable 10, exposing a slightly opened, clean surface of the outer conductor 11. The insulating medium 13 will usually not completely fill up the gap between the outer conductor 11 and the inner conductor 12. However, if the insulating medium 13 completely fills up the gap, a part of the insulating medium 13 shall be removed, so as to allow that in the subsequent process the protruding section 52 of the flare ring 50 is able to make contact with the inner surface of the outer conductor adjacent to the cuts. Preferably, any burr or rough edge at the cuts of the inner and outer conductors is removed. The plastic sheath 14 is peeled from the outer conductor 11 along a length sufficient to match the substrate section 61 of the slot finger 60, so that the plastic sheath 14 will not make contact with the inner thread of the substrate section 61.

As illustrated in FIG. 1, the prepared cable end is screwed into the connector rear body 22 and the outer thread of the outer conductor 11 of the cable 10 is screwed into the inner thread of the substrate section 61 of the slot finger 60, until they are in place and cannot be further screwed, and now the outer conductor 11 of the cable 10 rests against the first plane 55. And subsequently, the connector rear body 22 including the cable 10 is inserted into the connector front body 21, the connector rear body 22 is fastened and the shell 30 is rotated, and now the substrate section 51 of the flare ring 50 rests against the shoulder 37 of the shell 30. Then the shell 30 is further rotated to advance the protruding section 52 of the flare ring 50 in the substrate section 61 of the slot finger 60, and the wedge section 62 of the slot finger 60 is advanced in the inner wedge of the lock nut 70, until the outer surface of the lock nut 70 abuts against the end of the shell 30 and no more screwing is possible.

During this process, the first incline 54 and the second incline 67 compress the outer conductor 11 of the cable 10 along a direction perpendicular to the two inclines, and the first plane 55 and the second plane 66 compress the outer conductor 11 of the cable along the axial direction. Eventually, the substrate section 61 of the slot finger 60 forces the spring coil 56 against the shoulder 53 of the flare ring 50 and compresses the spring coil 56, and the wedge of the lock nut 70 compresses the elastic finger-shaped members 68 of the slot finger 60, so as to clamp the outer conductor 11 of the cable 10 and to fasten the cable 10 in place in the connector 20.

During the aforesaid mounting process, the mechanical and electrical connection between the cable 10 and the connector 20 is realized by means of the cooperation between the flare ring 50, the slot finger 60, the lock nut 70 and the shell 30. More specifically, the inner conductor 12 of the cable 10 and the inner conductor 34 in the shell 30 are electrically connected, while the outer conductor 11 of the cable 10 and the slot finger 60, the flare ring 50, the shell 30 and the coupling nut 40 are electrically connected, and the aforesaid both are electrically insulated from one another by means of the insulating medium 13 and the fastening ring 35.

Figure 6:
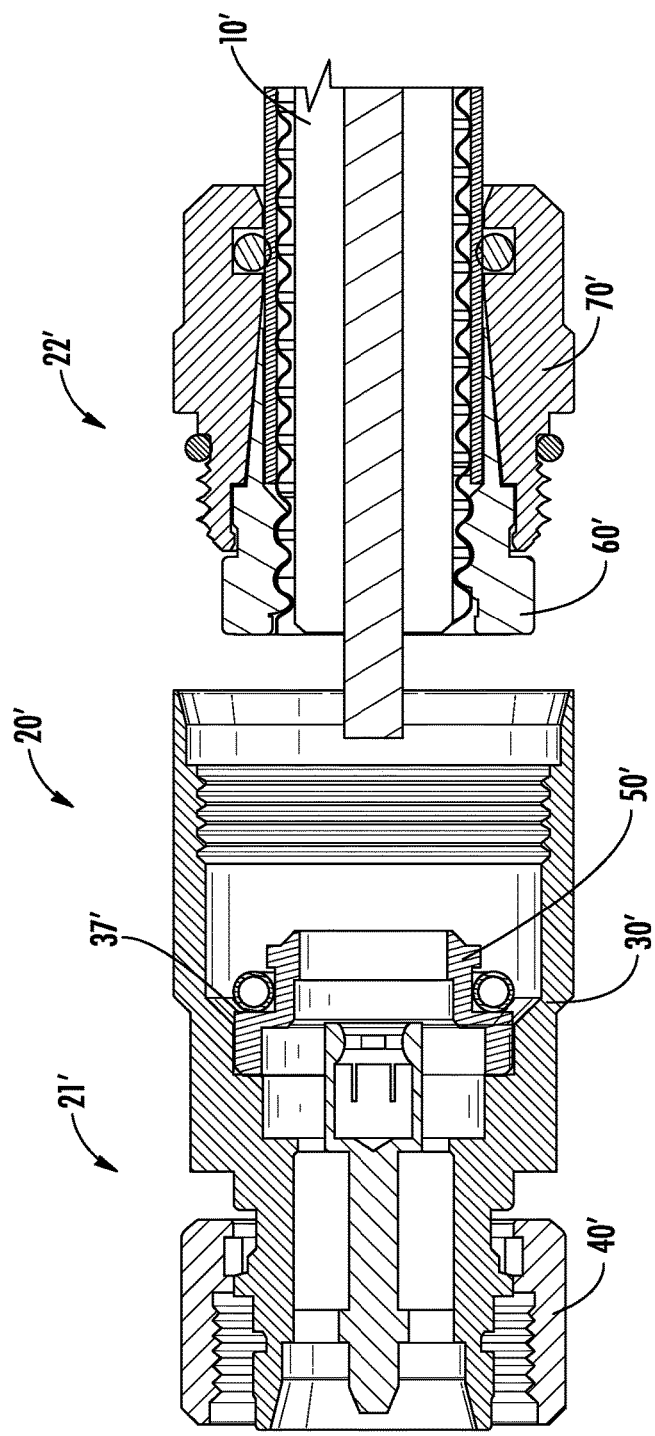
FIG. 6 illustrates a sectional view of a connector of a further embodiment according to the present invention, wherein the connector front body and the connector rear body are shown separately.

As illustrated in FIG. 6, a further embodiment of a connector 20' for connecting a threaded coaxial cable 10' is explained. The structure of the connector 20' is substantially identical with that of the connector 20, and below only the differences therebetween will be described. The connector 20' comprises a connector front body 21' and a connector rear body 22'. The connector front body 21' comprises a hollow shell 30', a coupling nut 40' which surrounds the shell 30' and is mounted on the shell 30', and a flare ring 50' which is mounted in the internal cavity of the shell 30'. The connector rear body 22' comprises a slot finger 60' and a lock nut 70' which are assembled together. The flare ring 50' is mounted in a snap-fit manner in the internal cavity of the shell 30' by means of a flange 37' on the shell 30', and may be rotated circumferentially in the shell 30', while being restricted axially and radially by the shell 30'. During the mounting process, the cable 10' can be connected to the connector 20' by means of screwing the connector front body 21' into the connector rear body 22'.

Although the present invention has been explained and described by way of one or more embodiments, yet for those skilled in the art, they may conceive of equivalent variations and modifications after reading and understanding the present description and drawings. In addition, although particular features of the present invention are disclosed by one of the several embodiments, yet these features may be combined with one or more other features of other needed or advantageous embodiments for any given or particular application. The present invention is solely defined according to the appended claims and the equivalents as described.

The terms used herein are merely used for describing particular embodiments and are not intended to restrict the present invention. As used herein, the singular forms "a" and "the" are also intended to include the plural forms, unless the context clearly indicates otherwise. In addition, with respect to the terms "include", "have", "possess", "with" or the variations thereof as used in the description and/or the claims, these terms are intended to be counted in in a form similar to the term "comprise".

Unless otherwise defined, all the terms used herein (including technical and scientific terms) have the same meanings as the meanings usually understood by one of those skill in the art. Besides, such terms as defined in the usually used dictionaries shall be construed as having the meanings consistent with the meanings in the context of the relevant fields and shall not be construed in a manner that is idealized or much too formal, unless so defined explicitly herein.

The invention claimed is:

1. A connector for a coaxial cable, the coaxial cable comprising an outer conductor, an inner conductor and an insulating medium located between the outer and inner conductors, wherein the connector comprises a hollow shell, a coupling nut mounted on the shell, and a connector inner conductor, a flare ring, a slot finger, and a lock nut, which are arranged together in the shell, with the flare ring at one end resting against a shoulder in the shell, the slot finger mounted on the flare ring, and the lock nut mounted on the slot finger and engaging an inner surface of the shell; and wherein the flare ring is provided with adjacent first incline and first plane, and the slot finger is provided with adjacent second incline and second plane, wherein the first incline configured for insertion between the outer conductor and the insulating medium of the coaxial cable, and wherein the first incline and the first plane configured to cooperate respectively with the second incline and the second plane, so as to simultaneously flare and crush the outer conductor of the coaxial cable.

2. The connector according to claim 1, wherein the connector comprises a connector front body and a connector rear body, wherein the connector front body comprises the shell, the coupling nut, and the connector inner conductor, which are connected together, and wherein the connector rear body comprises the flare ring, the slot finger, and the lock nut, which are connected together.

3. The connector according to claim 2, wherein the flare ring, the slot finger, and the lock nut are connected together by a snap-fit connection.

4. The connector according to claim 1, wherein the connector comprises a connector front body and a connector rear body, wherein the connector front body comprises the shell, the coupling nut, the connector inner conductor, and the flare ring, which are connected together, and wherein the connector rear body comprises the slot finger and the lock nut, which are connected together.

5. The connector according to claim 4, wherein the flare ring is mounted in an internal cavity of the shell by a snap-fit connection, and wherein the slot finger and the lock nut are connected together by a snap-fit connection.

6. The connector according to claim 1, wherein the shell comprises a main body section and a projecting section which projects axially forward from the main body section, and wherein the main body section comprises the shoulder and receives in an internal cavity thereof the flare ring, the slot finger and the lock nut.

7. The connector according to claim 6, wherein the coupling nut surrounds the shell and is mounted on the projecting section of the shell.

8. The connector according to claim 6, wherein the projecting section is provided in an internal cavity thereof with the connector inner conductor, which is fastened in the internal cavity of the projecting section by a fastening ring made from an insulator.

9. The connector according to claim 8, wherein the connector inner conductor is provided on a rear end thereof with a slotted, elastic grip hole configured to receive the inner conductor of the coaxial cable.

10. The connector according to claim 1, wherein the flare ring comprises a substrate section, a protruding section, and a shoulder therebetween that connects the substrate section and the protruding section, wherein the substrate section rests against the shoulder of the shell, and wherein the protruding section is provided on an axial rear end thereof with the first incline and the first plane.

11. The connector according to claim 10, wherein the protruding section is loaded with a spring coil for adjusting a relative distance between the flare ring and the slot finger, so as to control and adjust a stamina torque of the coaxial cable placed into the connector.

12. The connector according to claim 10, wherein the slot finger comprises a substrate section and a wedge section which is axially tapered rearward from the substrate section.

13. The connector according to claim 12, wherein the substrate section comprises an engaging part mounted on the protruding section, a crushing part, and a threaded part which engages an outer thread of the outer conductor of the coaxial cable, and wherein the crushing part comprises the second incline and the second plane.

14. The connector according to claim 12, wherein an internal cavity of the lock nut is tapered and cooperates with the wedge section of the slot finger, so as to clamp the outer conductor of the coaxial cable and to fasten the coaxial cable in place in the connector.

15. The connector according to claim 1, wherein the coupling nut is provided on a front side of an outer surface thereof with an outer thread configured to cooperate with an inner thread on an inner surface of the shell.

16. A connector for a coaxial cable, the coaxial cable comprising an outer conductor, an inner conductor and an insulating medium located between the outer and inner conductors, wherein the connector comprises a connector front body and a connector rear body, wherein the connector front body comprises a shell, and the connector rear body comprises a flare ring and a slot finger configured to be inserted into the shell, with the flare ring resting against a shoulder in the shell upon insertion of the flare ring into the shell, and with the slot finger mounted on the flare ring;

wherein the flare ring is provided with adjacent first incline and first plane, and the slot finger is provided with adjacent second incline and second plane, wherein the first incline configured for insertion between the outer conductor and the insulating medium of the coaxial cable, and wherein the first incline and the first plane respectively cooperate with the second incline and the second plane, so as to simultaneously flare and crush the outer conductor of the coaxial cable.

17. A connector for a coaxial cable, the coaxial cable comprising an outer conductor, an inner conductor and an insulating medium located between the outer and inner conductors, wherein the connector comprises a connector front body and a connector rear body, with the connector front body comprising a shell and a flare ring mounted in the shell, and the connector rear body comprising a slot finger which is configured to be inserted into the shell;

wherein the flare ring is provided with adjacent first incline and first plane, and the slot finger is provided with adjacent second incline and second plane, wherein the first incline configured for insertion between the outer conductor and the insulating medium of the coaxial cable, and wherein the first incline and the first plane respectively cooperate with the second incline and the second plane, so as to simultaneously flare and crush the outer conductor of the coaxial cable.

* * * * *

UNITED STATES PATENT AND TRADEMARK OFFICE
CERTIFICATE OF CORRECTION

PATENT NO. : 10,177,469 B2
APPLICATION NO. : 15/736556
DATED : January 8, 2019
INVENTOR(S) : Wu et al.

It is certified that error appears in the above-identified patent and that said Letters Patent is hereby corrected as shown below:

On the Title Page

Item (30) Foreign Application Priority Data:
Please correct "2015 1 0449596" to read -- 2015 1 0449596.8 --

Signed and Sealed this
Twelfth Day of March, 2019

Andrei Iancu
*Director of the United States Patent and Trademark Office*